United States Patent Office 2,967,775
Patented Jan. 10, 1961

2,967,775

UTILIZATION OF N-HYDROXYPHENYL UREAS AS ANTIOXIDANTS FOR EDIBLE FATS AND OILS

Mitchell F. Zienty, Elkhart, Ind., assignor to Miles Laboratories, Inc., Elkhart, Ind., a corporation of Indiana No Drawing. Filed Dec. 11, 1958, Ser. No. 779,573

11 Claims. (Cl. 99—163)

This invention relates to new and improved antioxidant compositions and to their use in stabilizing such autoxidizable materials as edible fats and oils and products containing them. More particularly, the present invention pertains to the utilization of N-para- and ortho-hydroxyphenyl urea compounds as antioxidants for the protection of edible fats and oils against the effects of oxidative deterioration.

It is well known that some fats and oils, especially, prepared fat products such as lard, are rather deficient in natural antioxidants and are therefore particularly susceptible to the development of rancidity marked by off-flavors, odors and colors. It is further well known that a large number of substances, notably certain classes of ortho- and para-substituted derivatives of benzene, are capable of slowing the rate of deterioration in the presence of oxygen or air.

Heretofore, however, it was believed that, for example, N-p-hydroxyphenyl urea "possesses no utility in the field of oxidation inhibition" (U.S. Patent Nos. 2,683,082 and 2,683,083).

In contrast thereto, the present invention resides in the very discovery of unexpected and exceptional antioxigenic activity manifested by N-p-hydroxyphenyl urea. In addition, I have found that its isomer, N-o-hydroxyphenyl urea, is also an effective inhibitor, although to a lesser degree than the para compound. These newly-discovered, effective antioxidants can conveniently and economically be obtained as reaction products of para- and ortho-aminophenols and potassium cyanate. Significantly, these new inhibitors comprise the requisite qualities for food antioxidants, namely, non-toxicity, solubility in fats and oils and absence of bad odors, tastes or colors after incorporation in the material to be protected.

Special embodiments of this invention comprise stabilized lard and castor oil but other edible fats and oils which may likewise be stabilized in accordance with the present invention include also butter, fat and beef tallow as well as linseed oil, rape seed oil, olive oil, corn oil, palm oil, coconut oil, peanut oil and the like.

Stabilization of these materials is effected by adding thereto from 0.025% up to 1% by weight, preferably from about 0.025 to 0.1% by weight, of N-p- or o-hydroxyphenyl urea.

When tested by means of the Swift Stability Test or, as it is also called, the Active Oxygen Method, the subject compounds were found to retard the development of rancidity for about 50 and 40 hours, respectively. The Swift Stability Test is described by A. F. King et al. in Oil and Soap Journal, v. 10, pp. 105–109 (1933); in general it consists in bubbling air through a sample of the lard until rancidity is determined organoleptically and by hydrogen peroxide values.

This invention will be illustrated but is not limited by the following examples:

EXAMPLE I

Five mg. of N-p-hydroxyphenyl urea (0.025% by weight) was added to 20 g. of melted lard. The lard used was commercially available rendered lard which has an uninhibited induction period of approximately 6 to 8 hours. In accordance with the Active Oxygen Method, referred to above, peroxide values were measured at various time intervals as follows:

*Table I*

| AOM time in hours: | $H_2O_2$ M-eq./kg. lard |
|---|---|
| 24 | 6 |
| 31 | 8 |
| 44 | 16 |
| 50 | 16 |
| 56 | 31 |

Data of this table demonstrate that the lard tested did not become rancid until after 50 hours, i.e. after 20 milliequivalents of $H_2O_2$ per kilogram of lard were present. This amount is commonly regarded as yardstick for rancidity in the art of oxidation inhibitions.

EXAMPLE II

A sample of N-p-hydroxyphenyl urea (0.025% by weight) was added to castor oil which has an induction period of about 20 hours. The peroxide values at various time intervals were as follows:

*Table II*

| AOM time in hours: | $H_2O_2$ M-eq./kg. castor oil |
|---|---|
| 4 | 4 |
| 12 | 8 |
| 22 | 14 |
| 30 | 16 |
| 48 | 22 |

These data indicate that spoilage of the castor oil was not effected until approximately after 45 hours of exposure to air.

EXAMPLE III

In this example N-o-hydroxyphenyl urea was tested for its antioxigenic activity. Five mg. were added to the melted lard. Peroxide values which show that rancidity set in only after approximately 40 hours, were as follows:

*Table III*

| AOM time in hours: | $H_2O_2$ M-eq./kg. lard |
|---|---|
| 11 | 4 |
| 17 | 6 |
| 26 | 9 |
| 35 | 17 |
| 43 | 23 |

Under the same conditions, butylated hydroxy toluene, the well known lard antioxidant, protects lard against spoilage for only 40 hours, while butylated hydroxy anisol, commonly used for stabilizing vegetable oils, preserves castor oil from deterioration for only 30 hours. In contrast thereto, the data contained in the above tables establish that N-o-hydroxyphenyl urea is at least equivalent, while N-p-hydroxyphenyl urea considerably surpasses the above mentioned comercial inhibitors as regards their respective antioxigenic properties.

In summary, the present invention pertains to the use of N-ortho- and para-hydroxyphenyl ureas as efficient deterioration retarders. If admixed in small amounts ranging from about 0.025 to 0.1% by weight to edible fats and oils which are subject to oxidative deterioration, the substances may be stabilized for over 50 hours. N-p-hydroxyphenyl urea is especially preferred as antioxidant in an amount comprising 0.025% by weight.

What is claimed is:

1. A substance selected from the group consisting of edible fats and oils subject to oxidative deterioration containing as an inhibitor from about 0.025 to about 0.1% by weight of a urea selected from the group consisting of N-p-hydroxyphenyl urea and N-o-hydroxyphenyl urea to retard said deterioration.

2. A substance according to claim 1 wherein the inhibitor is N-p-hydroxyphenyl urea.

3. A substance according to claim 1 wherein the inhibitor is N-o-hydroxyphenyl urea.

4. Lard subject to oxidative deterioration containing as an inhibitor from about 0.025 to about 0.1% by weight of a urea selected from the group consisting of N-p-hydroxyphenyl urea and N-o-hydroxyphenyl urea to retard said deterioration.

5. Lard subject to oxidative deterioration containing as an inhibitor about 0.025% by weight of N-p-hydroxyphenyl urea to retard said deterioration.

6. Castor oil subject to oxidative deterioration containing as an inhibitor about 0.025% by weight of N-p-hydroxyphenyl urea to retard said deterioration.

7. A method of stabilizing edible fats and oils subject to oxidative deterioration which comprises adding thereto an inhibitor comprising a urea selected from the group consisting of N-p-hydroxyphenyl urea and N-o-hydroxyphenyl urea in an amount ranging from about 0.1 to about 0.025% by weight to retard said deterioration.

8. A method of stabilizing lard subject to oxidative deterioration which comprises adding thereto as inhibitor about 0.025% by weight of N-p-hydroxyphenyl urea.

9. A method of stabilizing castor oil subject to oxidative deterioration which comprises adding thereto as inhibitor about 0.025% by weight of N-p-hydroxyphenyl urea.

10. A substance selected from the group consisting of edible fats and oils subject to oxidative deterioration containing as an inhibitor from about 0.25 to about 1% by weight of a urea selected from the group consisting of N-p-hydroxyphenyl urea and N-o-hydroxyphenyl urea.

11. A method of stabilizing edible fats and oils subject to oxidative deterioration which comprises adding thereto in an amount from about 0.25 to 1% by weight an inhibitor comprising a urea selected from the group consisting of N-p-hydroxyphenyl urea and N-o-hydroxyphenyl urea.

References Cited in the file of this patent

UNITED STATES PATENTS 2,663,730    Hill et al.    Dec. 22, 1953